Feb. 22, 1944.   A. LISSIANSKY   2,342,411
MACHINE FOR RECORDING AND DISPENSING PHONOGRAPH RECORDS
Filed Dec. 31, 1940    9 Sheets-Sheet 1

Inventor
ALEXANDER LISSIANSKY
By
Attorney

Feb. 22, 1944. A. LISSIANSKY 2,342,411
MACHINE FOR RECORDING AND DISPENSING PHONOGRAPH RECORDS
Filed Dec. 31, 1940 9 Sheets-Sheet 2

Inventor
ALEXANDER LISSIANSKY
By Edwin Leisohn
Attorney

Feb. 22, 1944. A. LISSIANSKY 2,342,411
MACHINE FOR RECORDING AND DISPENSING PHONOGRAPH RECORDS
Filed Dec. 31, 1940 9 Sheets-Sheet 3
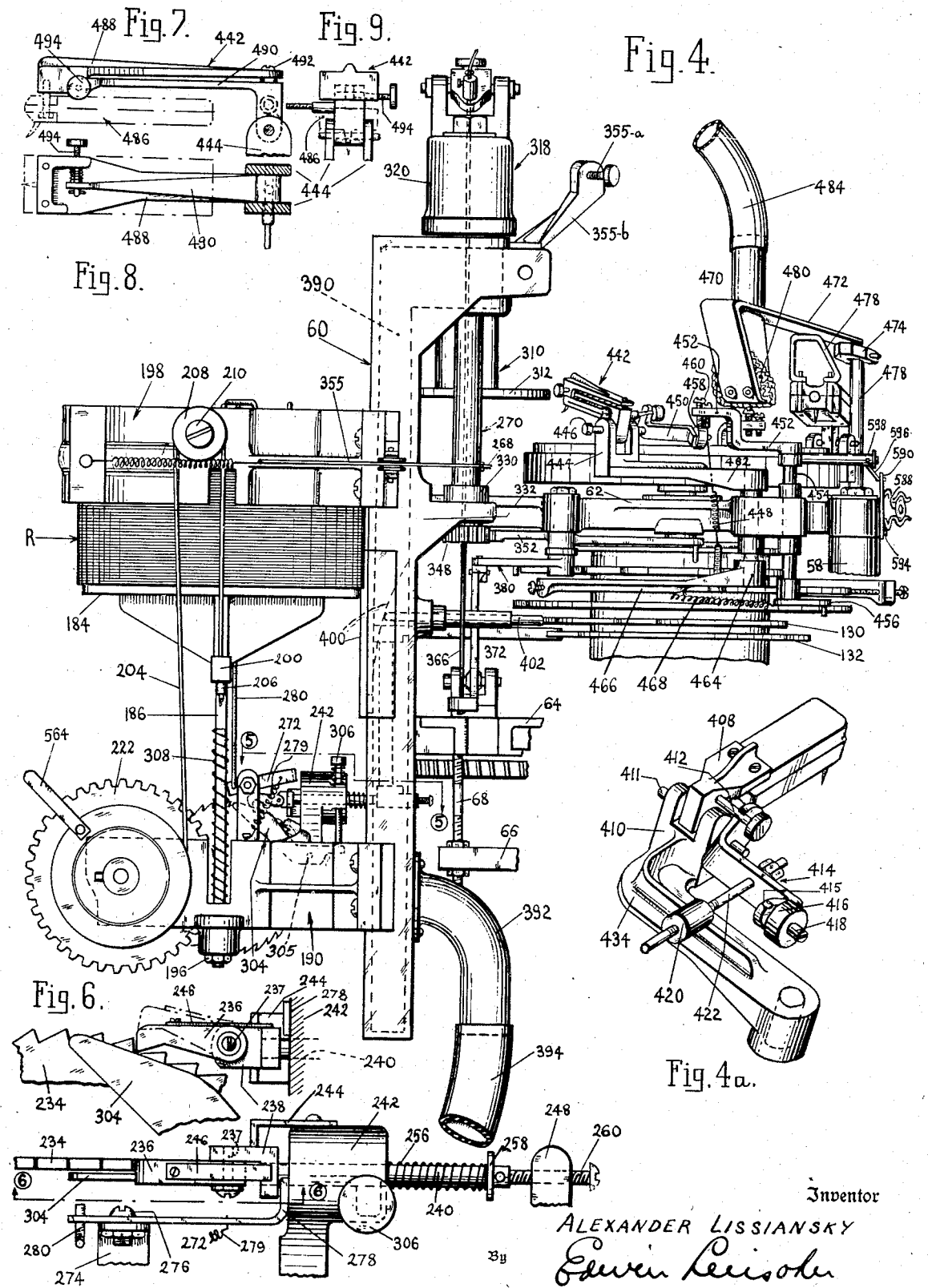
Inventor
ALEXANDER LISSIANSKY
By Edwin Levisohn
Attorney Feb. 22, 1944.  A. LISSIANSKY  2,342,411
MACHINE FOR RECORDING AND DISPENSING PHONOGRAPH RECORDS
Filed Dec. 31, 1940   9 Sheets-Sheet 4

Inventor
ALEXANDER LISSIANSKY
By Edwin Linsohn
Attorney

Feb. 22, 1944. A. LISSIANSKY 2,342,411
MACHINE FOR RECORDING AND DISPENSING PHONOGRAPH RECORDS
Filed Dec. 31, 1940 9 Sheets-Sheet 7

Inventor
ALEXANDER LISSIANSKY
By Edwin Levisohn
Attorney

Feb. 22, 1944. A. LISSIANSKY 2,342,411
MACHINE FOR RECORDING AND DISPENSING PHONOGRAPH RECORDS
Filed Dec. 31, 1940 9 Sheets-Sheet 8
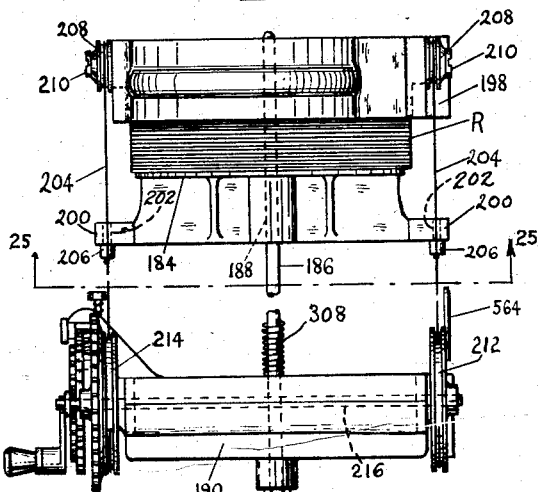
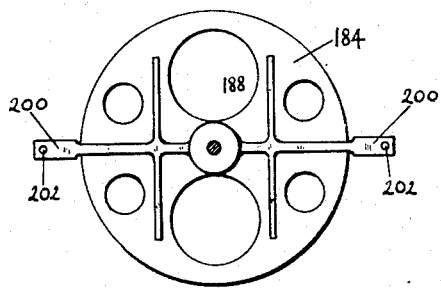
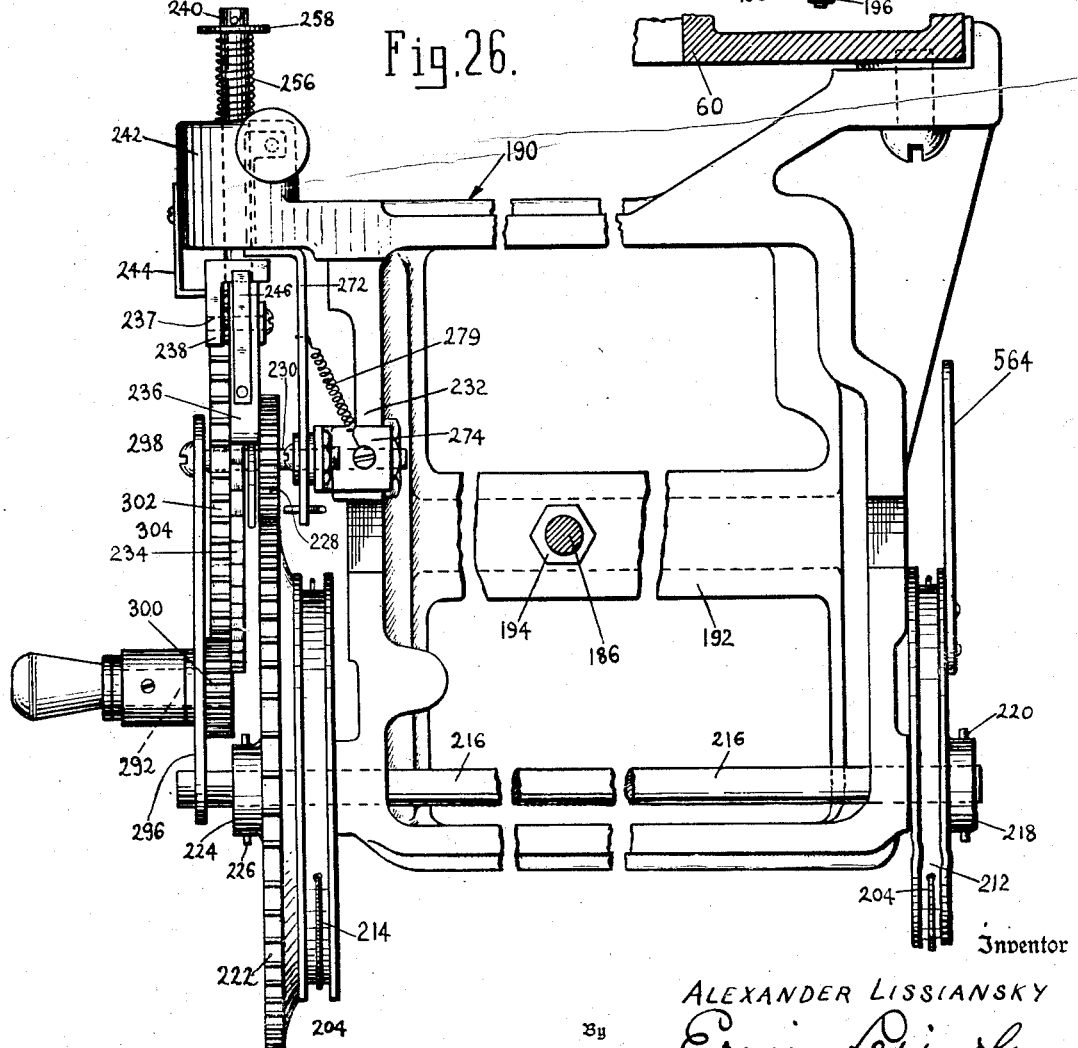
Inventor
ALEXANDER LISSIANSKY
By Erwin Levison
Attorney Feb. 22, 1944.     A. LISSIANSKY     2,342,411
MACHINE FOR RECORDING AND DISPENSING PHONOGRAPH RECORDS
Filed Dec. 31, 1940     9 Sheets-Sheet 9
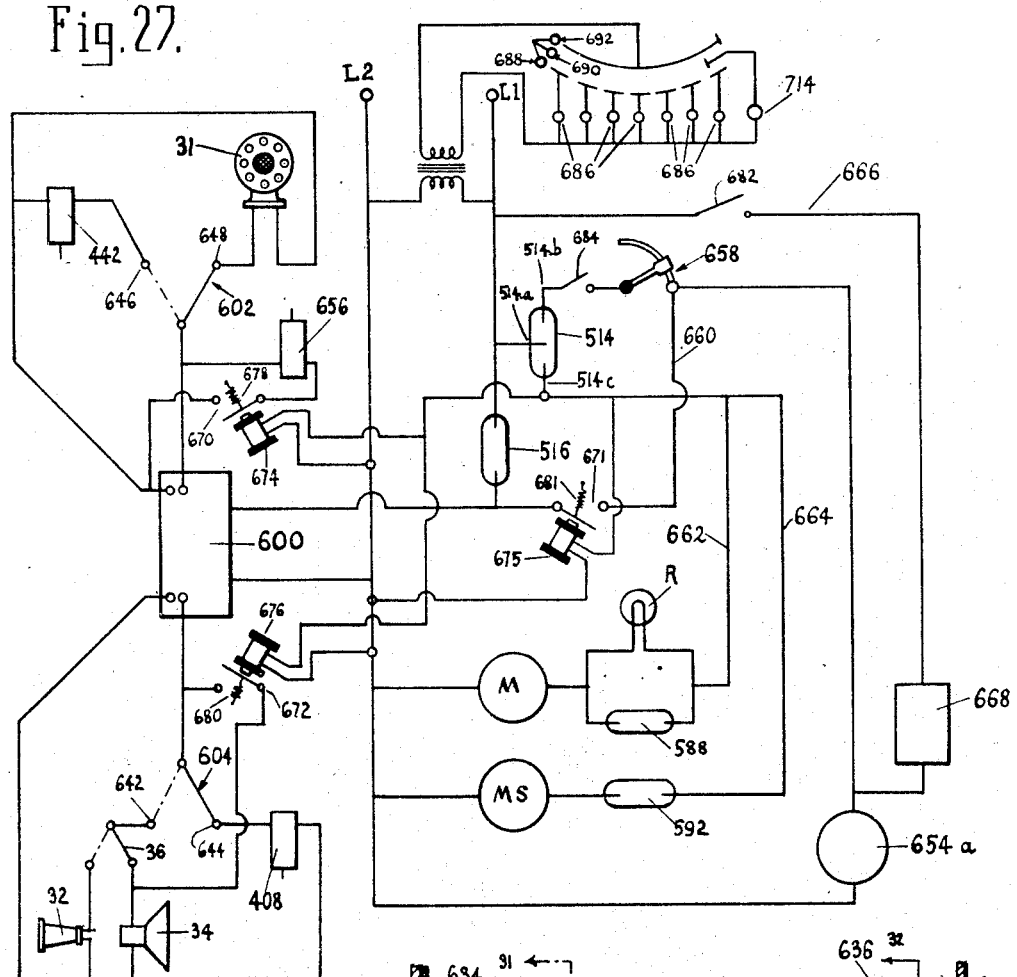
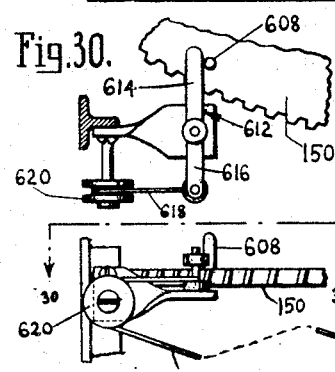
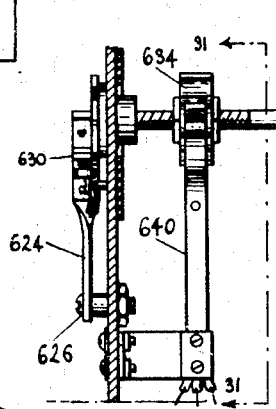
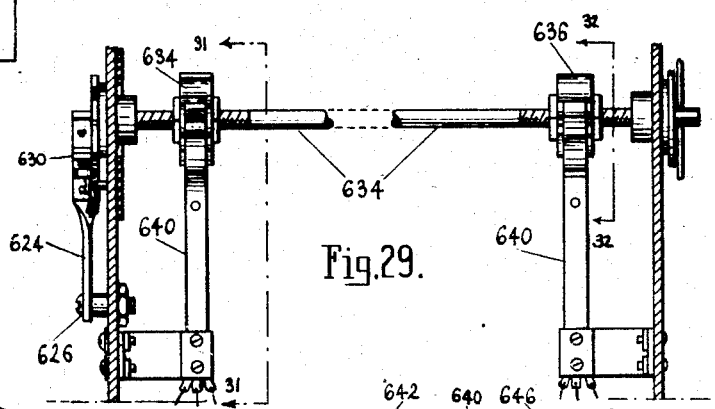
Inventor
ALEXANDER LISSIANSKY
By Edwin Leisoher
Attorney Patented Feb. 22, 1944

2,342,411

UNITED STATES PATENT OFFICE 2,342,411

MACHINE FOR RECORDING AND DISPENSING PHONOGRAPH RECORDS

Alexander Lissiansky, New York, N. Y., assignor to International Mutoscope Corporation, Long Island City, N. Y., a corporation of New York Application December 31, 1940, Serial No. 372,532

12 Claims. (Cl. 274—10)

This invention relates to coin-controlled machines for recording and dispensing phonographic records.

Among the primary objects of the invention are to provide a phonographic recording and dispensing machine which is automatically operable under the control of a coin-actuated or controlled mechanism to record the operator's voice and to dispense a record thereof and preferably to reproduce the record after the recording operation and prior to the dispensing operation; to provide a machine of this type which is reliable in operation and which requires little or no attention except to replenish the supply of record disks from time to time; to provide a machine of this type which has the parts thereof compactly arranged so that it can be of relatively small size; to provide the machine with means for effectively indicating to the operator of the machine approximately the time remaining for recording purposes after the machine starts to operate and prior to the stage of operation at which reproduction of the record will automatically start; to return coins inserted during the operation of the machine or when the supply of record disks is exhausted; to safeguard the machine and the operation thereof from injury or interference due to the insertion of a coin prior to a complete cycle of operation; and, in general, to provide a commercially practical machine of this type whereby records of high quality can be made and disposed at a low price per record thereby to attract custom to the machine.

A further object of the invention is to provide a machine of the type referred to with means for attracting attention thereto. More specifically, in accordance with this object of the invention there is provided in combination with the phonograph recording machine a phonograph of the automatic repeating type operable to reproduce a record repeatedly for directing attention to the machine, the arrangement being such that the phonograph is automatically silenced during the operation of the machine and is automatically set into operation after the operation of the machine.

The above objects, features and advantages of the invention and others not particularly hereinbefore referred to will be fully understood from the following description with reference to the accompanying drawings which illustrate a preferred embodiment of the invention.

In the drawings:

Fig. 4 is a rear view, in elevation, of parts of the apparatus illustrated in Fig. 3;

Fig. 4a is a detail perspective view of the mounting of the sound recording head;

Fig. 5 is a top plan view of part of the device for operating the supporting means for the record disks, said view being taken on the line 5—5 of Fig. 4;

Fig. 6 is a view on the line 6—6 of Fig. 5;

Figs. 7, 8 and 9 are side, bottom and end views, respectively, of the sound reproducing head, showing the mounting of the pick-up means;

Figure 3:
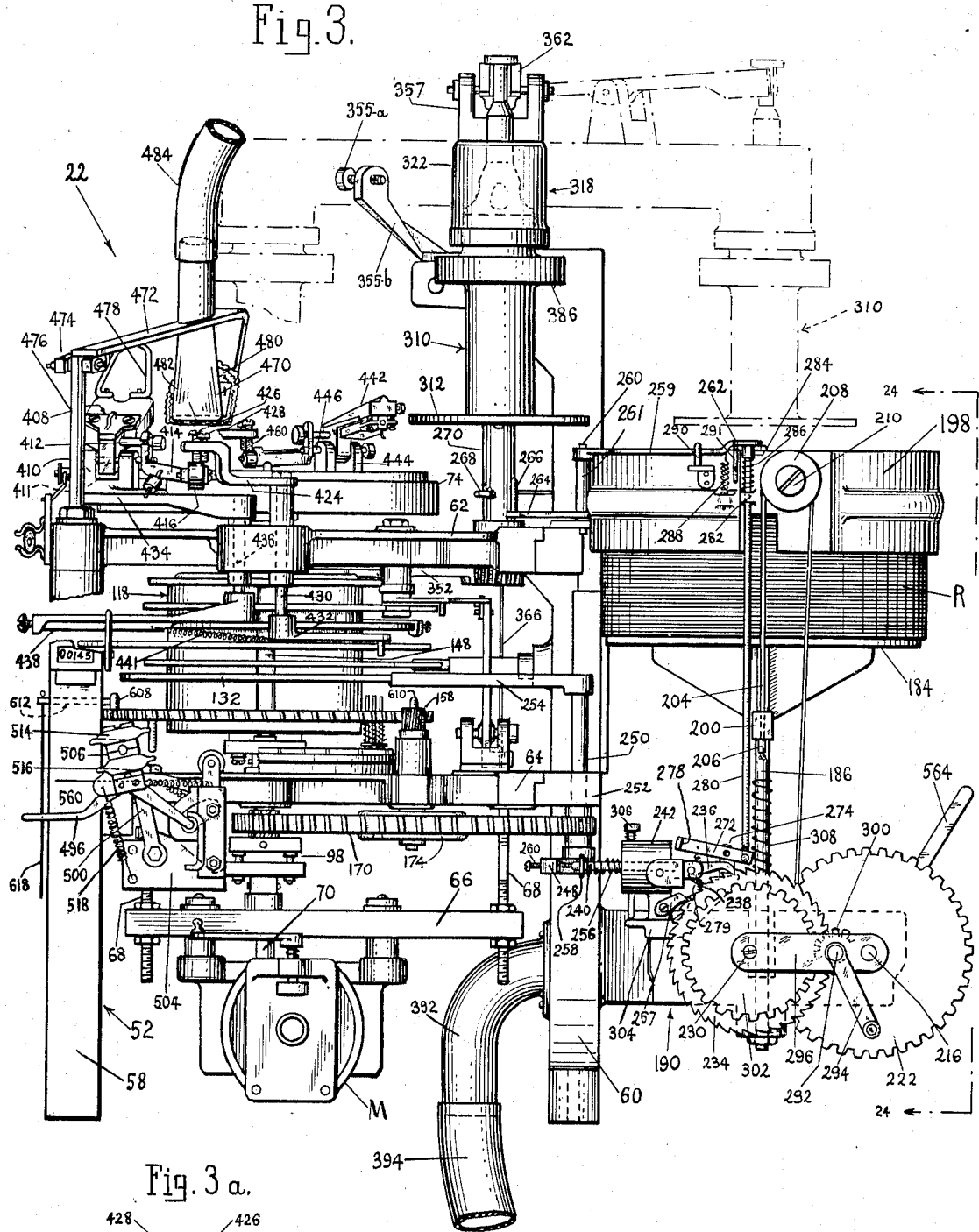
Fig. 3 is a front view, on a larger scale, of the major part of the apparatus.
Figure 10:
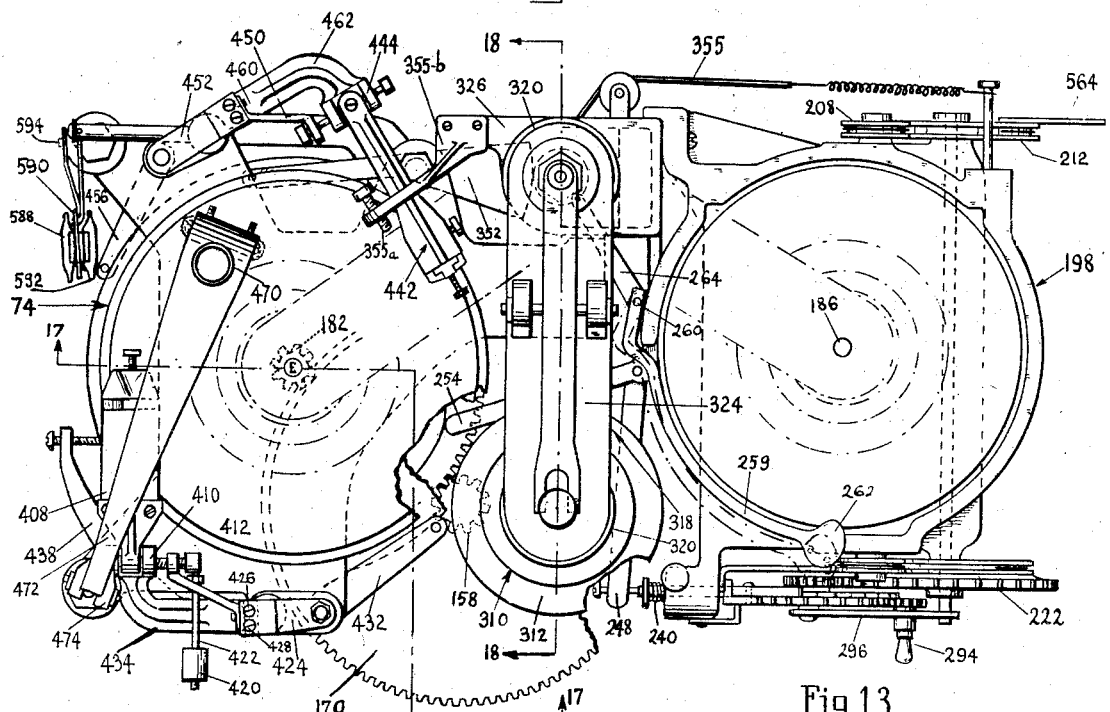
Fig. 10 is a top plan view of the apparatus illustrated in Fig. 3.
Figure 17:
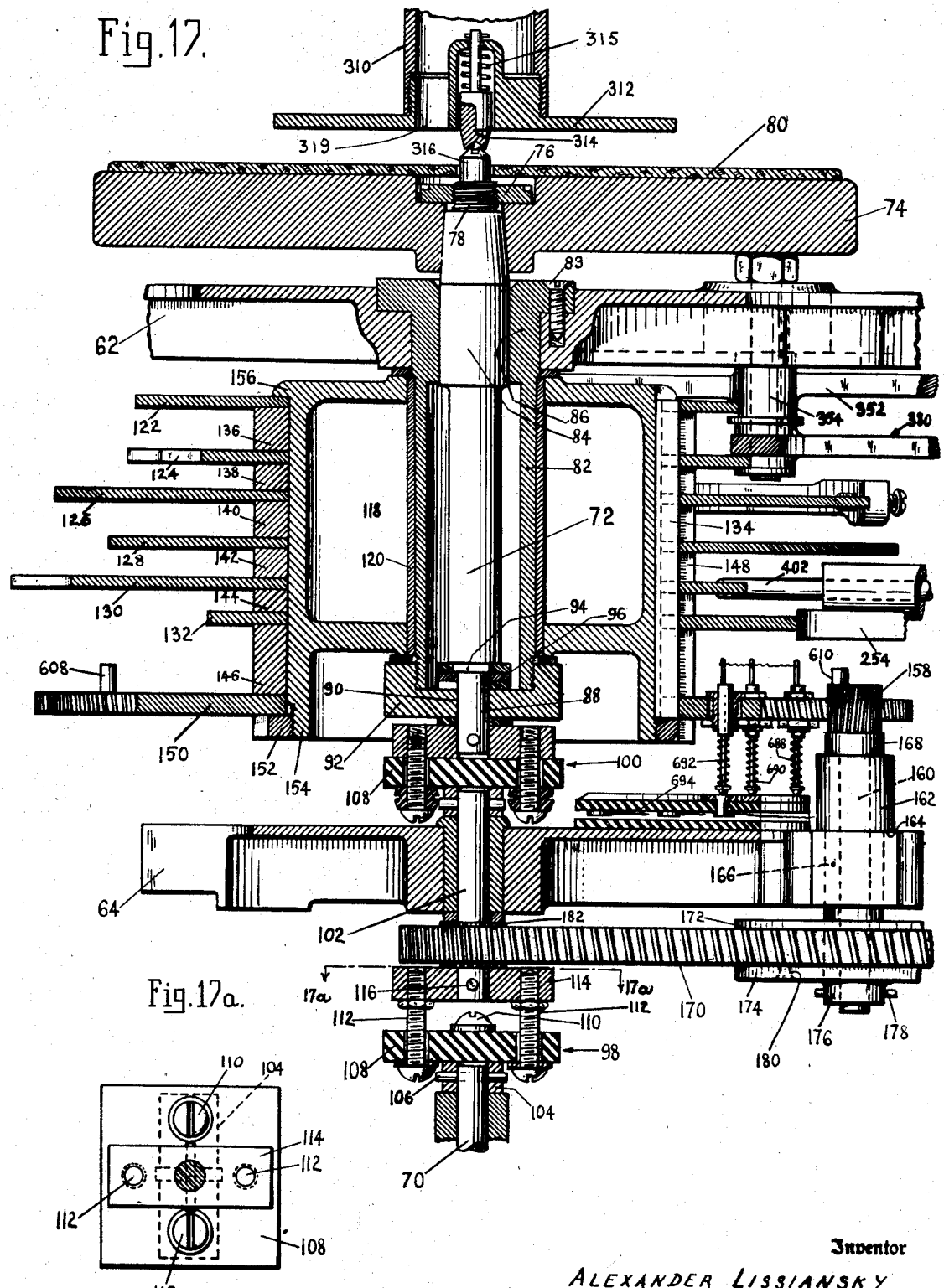
Figure 18:
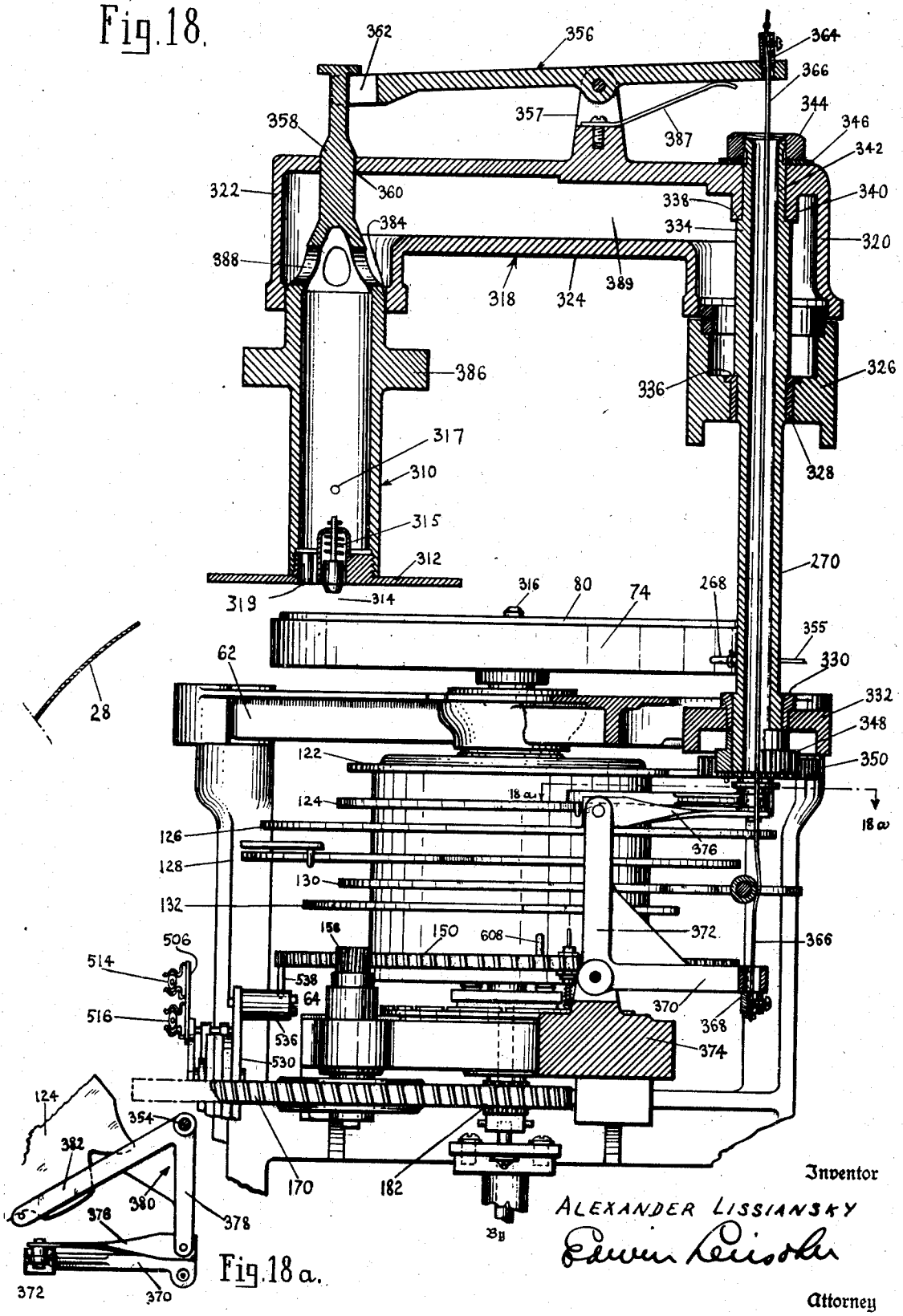
Figure 19:
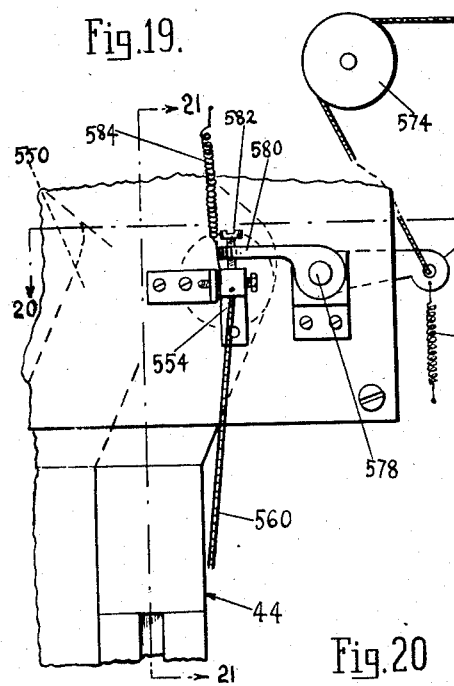
Figure 20:
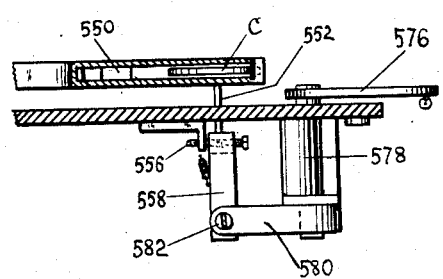
Figure 21:
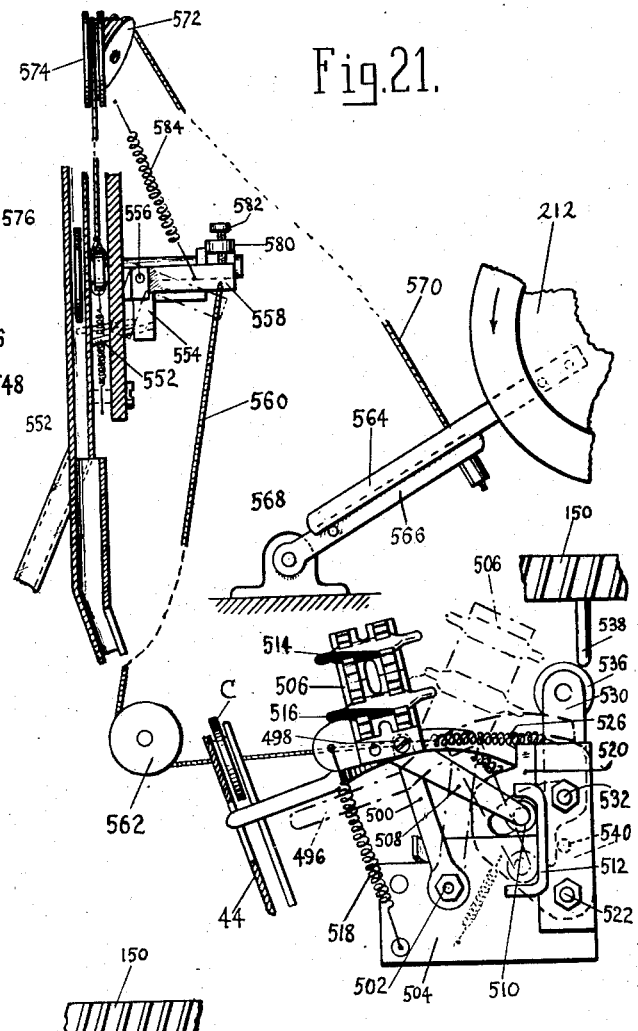
Figure 23:
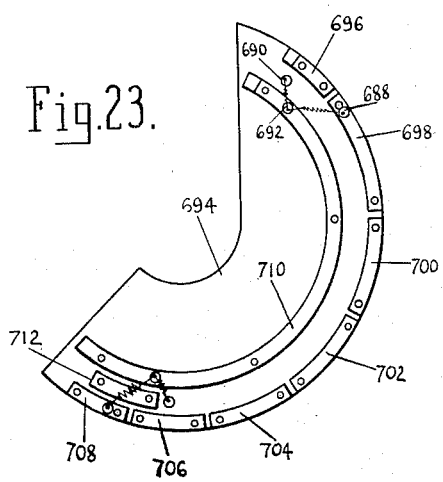
Figure 22:
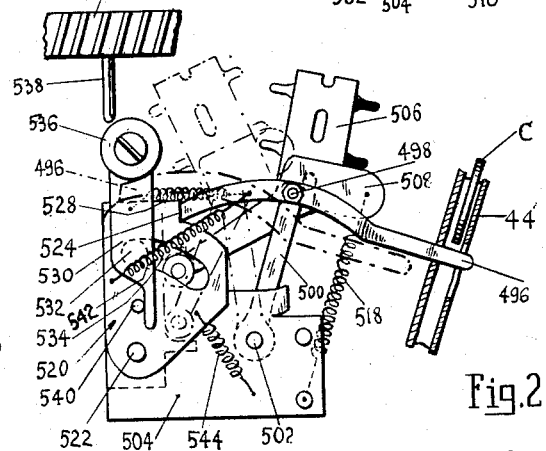

Figs. 11 to 16, inclusive, are plan views of control devices with which the apparatus is provided, the several cams and followers, respectively, being shown in their starting positions;

Fig. 17 is a sectional view on the line 17—17 of Fig. 10;

Fig. 17a is a detail sectional view on the line 17a—17a of Fig. 17;

Fig. 18 is a sectional view on the line 18—18 of Fig. 10;

Fig. 18a is a detail view on the line 18a—18a of Fig. 18;

Fig. 19 is a fragmentary side view of the coin chute and part of the associated mechanism;

Fig. 20 is a view on the line 20—20 of Fig. 19;

Fig. 21 is a front view of the coin-actuated mechanism, and part of the coin chute and of other parts associated with the coin chute, said view being taken along the part of the coin chute indicated by the line 21—21 of Fig. 19;

Fig. 22 is a rear view of the coin-actuated mechanism;

Fig. 23 is a top plan view of part of the control device of the indicator;

Fig. 24 is a side view of the record-disk supporting and feeding means taken along the line 24—24 of Fig. 3;

Fig. 25 is a view on the line 25—25 of Fig. 24;

Fig. 26 is a top view of the lower frame member of the record-disk feeding mechanism and of parts of said mechanism;

Fig. 27 is a circuit diagram;

Fig. 28 is a view in elevation of the change-over switch mechanism;

Fig. 29 is a view on the line 29—29 of Fig. 28;

Fig. 30 is a view on the line 30—30 of Fig. 28;

Fig. 31 is a detail sectional view on the line 31—31 of Fig. 29;

Fig. 32 is a sectional detail view on the line 32—32 of Fig. 29.

Referring now to the drawings in detail, the phonographic machine 10 embodying the present invention comprises a cabinet 12 divided generally into a lower portion 14 and an upper portion 16 by an intermediate forwardly inclined wall 18. The lower part 14 of the cabinet constitutes a housing 20 for the apparatus indicated generally at 22 in Fig. 2. Said compartment is provided with a removable front cover 24 having a record-discharge opening 26 which communicates with the discharge chute 28 through which the recorded disks are dispensed. The upper part 16 of the cabinet is open at the front to provide access by the operator to the mouthpiece and earphone set 30 used by the operator for transmitting his voice to be recorded in the operation of the machine. During the recording stage, the operator talks into the microphone 31 which is in fixed spaced relation to the earphone 32 so that when the latter is held against the ear, the mouthpiece is properly positioned and spaced in relation to the operator's mouth. When the record is reproduced following the recording thereof the operator can hear the same, optionally, either through the earphone 32 of said set or through the loud speaker 34 mounted at the top of the cabinet, a switch 36 being provided for connecting the pick-up or reproducing device of the machine either to said earphone 32 or to the loud speaker 34 at the option of the operator.

Figure 1:
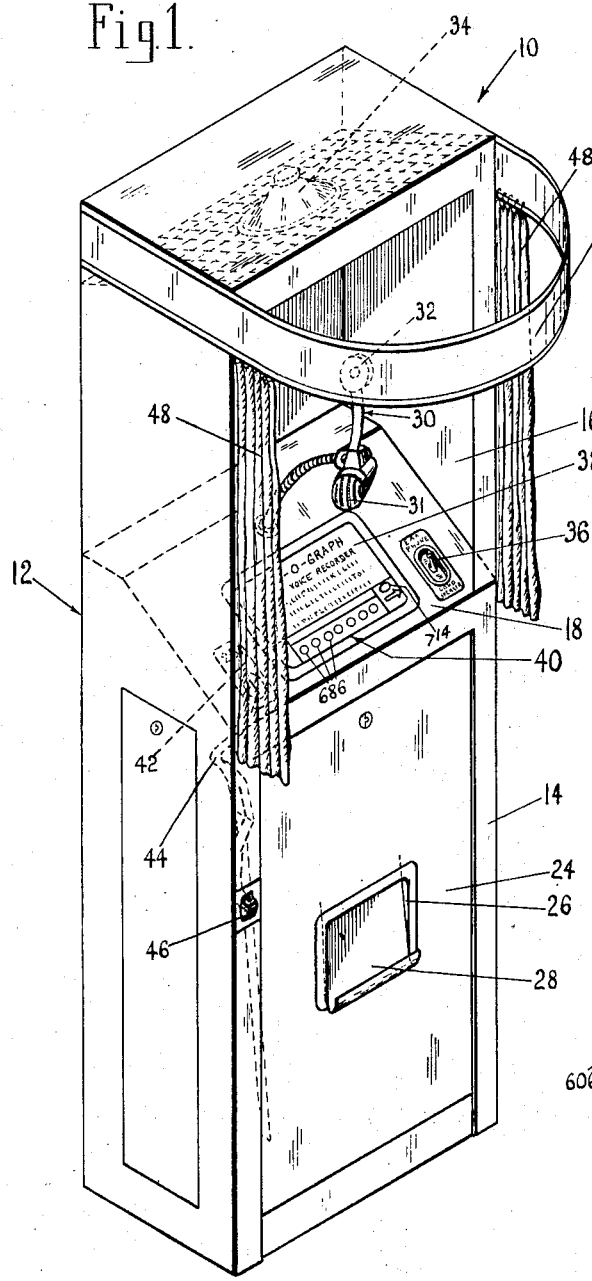
Fig. 1 is a perspective view of a phonographic recording and reproducing machine embodying the present invention.

An instruction plate 38 is mounted on wall 18 and includes an electrically operated indicator 40 which, as hereinafter described, is actuated during the recording operation as the recording proceeds in order to inform the operator as to the available time remaining for recording his voice during the operation of the machine. The coin insertion slot formed in a conventional plate 42 and in wall 18 communicates with the coin chute 44. A coin return opening 46 is provided at the front of the cabinet below wall 18 and communicates with chute 44 so that under certain conditions as, for example, when the supply of record disks is depleted, a coin inserted in the slot through plate 42 will be returned through the coin return opening 46. The cabinet is as here shown provided with curtains 48 carried by a curved band or bracket 50 supported at its ends at the top of the cabinet. Said curtains 48 are mounted for adjustment on bracket 50 so that they can be moved from the open position indicated in Fig. 1 to a closed position around the upper part of the operator, in case the latter desires privacy during the operation of the machine.

Figure 2:
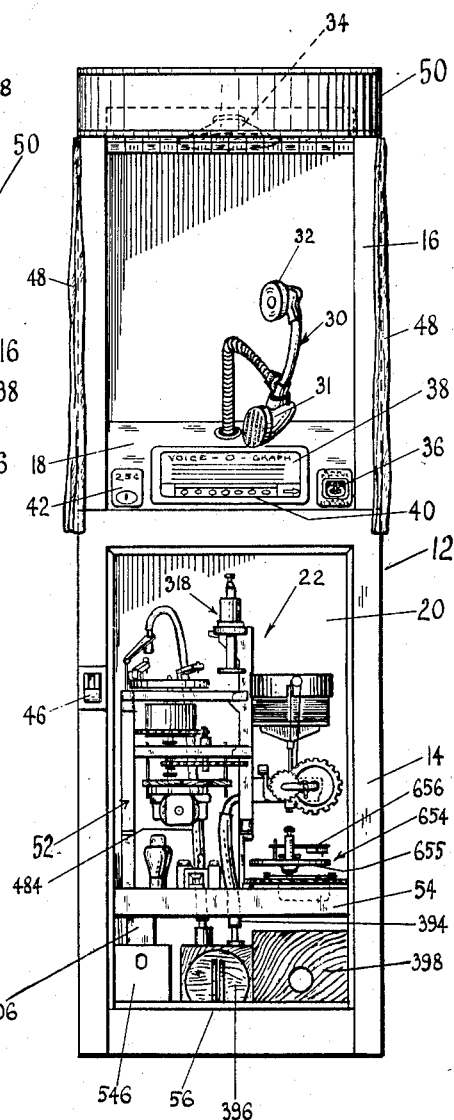
Fig. 2 is a front view of the machine, the front closure of the bottom of the cabinet being removed, to show, more or less generally, the apparatus.

Apparatus 22, which as hereinbefore stated, is indicated more or less generally in Fig. 2, will now be more specifically referred to and described. As shown in Fig. 2 the major part of said apparatus is carried by a frame 52 mounted on a horizontal supporting wall 54 spaced above the bottom wall 56 of the cabinet. Certain auxiliary devices hereinafter to be more fully referred to, are mounted in the cabinet below horizontal supporting wall 54. As shown in Fig. 3, frame 52 includes spaced upright members 58 and 60 and vertically spaced horizontal plates 62 and 64. A supporting plate 66 from which the main electric actuating motor M is hung is supported by rods 68 depending from lower frame 64. Electric motor M is designed, either by the provision of reduction gearing or in some other well known way, to drive a shaft 70 at the speed suitable for driving the turntable shaft 72 (Fig. 17) at the proper speed for recording and reproducing the record disk.

The turntable or rotary support 74 is carried by the upper end of shaft 72 above plate 62 of the frame, and is releasably secured in non-rotary relation to said shaft by a nut 76 engaging the threaded end portion 78 of the shaft. Rotary support 74 is provided with a layer 80 of suitable friction material. Shaft 72 is mounted for rotation in a stationary cylindrical member 82 which is fixed to and depends from frame plate 62. Member 82 is fixed to plate 62 by one or more screws 83. An upper end portion 84 of shaft 72 is journalled for rotation in the bearing portion 86 of member 82. The lower end portion 88 of shaft 72 is of reduced diameter and projects through and is rotatable in an opening 90 in an end cap 92 which is threaded on and fixed to the lower end of member 82. The reduced end portion 88 of shaft 72 provides the latter with a peripheral shoulder 94 which engages a horizontal bearing member 96 carried by cap 92.

The connection between motor shaft 70 and turntable shaft 72 is provided through couplings 98 and 100 connected to said shafts, respectively, and to an intermediate shaft 102 journalled for rotation in cross plate 64. Couplings 98 and 100 are as here shown of the shock-absorbing type whereby to provide for the smooth starting and stopping of the turntable and to prevent shocks from being transmitted from shaft 70 to turntable shaft 72 and to other parts of the apparatus and from other parts of the apparatus to turntable shaft 72. For this purpose, the upper end of shaft 70 is connected to a rigid cross bar 104 by means of a pin 106, said cross bar 104 being fixed to a resilient rubber block 108 by a pair of screws 110. Rubber block 108 is connected by a pair of screws 112 to a rigid bar 114 fixed to the lower end of shaft 102 by a cross pin 116. Coupling 100 is of the same construction as coupling 98, the resilient block 108 thereof being connected to the upper end of shaft 102.

A cylindrical control drum 118 is mounted for rotation on member 82 about shaft 72 concentrically therewith. For this purpose drum 118 is provided with a bearing sleeve 120 fixed thereto and journalled for rotation on member 82. Said control drum is provided with cams 122, 124, 126, 128, 130 and 132 disposed concentrically of the drum and in axially spaced relation thereon, said cams being held against rotation on said drum by a key 134. Said cams are held in properly spaced relation by a plurality of spacing rings 136, 138, 140, 142, 144 and 146 which are split as indicated at 148 (Figs. 3 and 17) to permit the insertion of the key 134. A gear plate 150 is also secured to drum 118 in fixed relation thereto for rotating said drum. A nut 152 is threaded on the lower end portion 154 of the drum for holding said cams and said gear in position axially of the drum, the upper end of the latter being provided with a peripheral shoulder 156 which engages cam 122. Thus, the cams and gears, together with the intermediate spacing sleeves, are clamped as a unit between shoulder 156 and nut 152 and can be placed on and removed from the drum when nut 152 is removed.

Gear 150 is rotated by a gear 158 fixed to or integral with the upper end of shaft 160. The bearing 162 for shaft 160 is supported on plate 64 by a peripheral shoulder 164 formed by providing said bearing with the reduced portion 166 which passes through said plate. A bearing collar 168 is provided between the upper end of bearing 162 and the geared portion of shaft 160 for supporting the latter in vertical position. A gear 170 for driving shaft 160 is mounted at the lower end of said shaft and is fixed thereto by and between an upper plate 172 and a lower plate 174, the latter being provided with an integral collar 176 fixed against rotation on shaft 160 by a pin 178. Gear 170 is secured to plates 172 and 174 by a plurality of screws 180 which are threaded through said gear and said plates. Gear 170 is driven by a gear 182 fixed to and rotated by shaft 102.

The apparatus is provided with means for supporting a stack R of record disks and for moving said stack of disks upwardly step by step in order to bring the uppermost disk in proper position to be transferred to the turntable 74. Said supporting means for the stack of records comprises a horizontal plate 184 (Fig. 3), which is mounted for vertical movement longitudinally of an upstanding guide rod 186. Plate 184 is provided with a central opening 188 (Fig. 24) through which rod 186 projects for centering the record disks, said rod passing through the central openings in said disks and terminating at its upper end slightly above the uppermost disk when the latter is in the position to be transferred to the turntable. Rod 186 is fixed to the lower frame member 190 which is secured to and projects horizontally from frame member 60. Said rod 186 is secured to the cross bar 192 of frame member 190 removably in stationary position by nuts 194 and 196 (Figs. 24 and 26). An upper cylindrical frame member 198 is secured to and projects laterally from frame member 60 and is positioned concentrically of rod 186 at the upper end portion thereof.

Plate 184 is provided with opposite lateral projections 200 provided with apertures 202. End portions of cords or wires 204 pass through said apertures 202 and have secured thereto retaining members 206 which engage the lower surfaces of lateral projections 200 for supporting plate 184. Cords or wires 204 extend upwardly over and in engagement with rotary guide pulleys 208 (Fig. 3) mounted for rotation upon upper frame member 198 by means of bearing screws 210. The lower ends of cords 204 are secured to grooved wheels 212 and 214 disposed at opposite sides, respectively, of lower frame member 190 (Fig. 26) and mounted on a shaft 216 journalled for rotation in said frame member. Wheel 212 is rotated by said shaft and for that purpose is provided with an integral collar 218 and is secured to the shaft by means of a pin 220 which passes through said collar and through the end of the shaft. Wheel 214 is formed integrally with a gear 222 which is provided with a collar 224 and which is fixed to said shaft by a cross pin 226 passing through said collar and the end of the shaft. It will be understood that when gear 222 is rotated counter-clockwise, viewing Fig. 3, plate 184 is moved upwardly by cords 204 which wind around wheels 212 and 214, respectively.

The means for rotating gear 222 will now be described. Said means comprises a gear 228 (Fig. 26) which meshes with gear 222 and is fixed to a shaft 230 journalled for rotation in part 232 of lower frame member 190. Shaft 230 is rotated by a ratchet wheel 234 which is fixed thereto. Said ratchet wheel is actuated by a pawl 236 pivoted by means of a pivot pin 237 on a bracket 238 fixed at one end of a reciprocable rod 240 which is mounted for sliding movement in a guide bearing 242 formed on frame member 190. Bracket 238 is also slidably engaged by a guide 244 for preventing rod 240 from rotating in its bearing. A spring 246 fixed to pawl 236 and engaging bracket 238 holds said pawl releasably in ratchet-engaging position. Rod 240 is projected and retracted under the control of cam 132 by means of an arm 248 (Figs. 3, 5 and 10) fixed to the lower end of a vertical rod 250. Said rod 250 is mounted for pivotal movement about its longitudinal axis in a bracket 252 provided on frame member 60, said rod being held against vertical movement in said bracket in any suitable way, for example, by a collar (not shown) fixed to said rod above bracket 252. The upper end of rod 250 has fixed thereto an arm 254 which engages cam 132. A spring 256 (Fig. 5) serves to maintain arm 254 in contact with cam 132 (Fig. 17). Said spring surrounds rod 240 and bears at one end thereof against one end of guide-bearing 242 and at the other end thereof against a collar 258 fixed to said rod. It will be noted that arm 248 is provided with an adjustable screw 260 which, as shown more clearly in Fig. 5, bears on the adjacent end of rod 240. A pivoted pawl 257 is provided to prevent reverse movement of ratchet 234, said pawl being mounted on a part fixed to and extending below guide-bearing 242 (Fig. 3).

It will be understood that during one revolution of cam 132, which occurs once during each operation of shaft 72, rod 240 is projected by arm 248 thereby to actuate pawl 236 for moving ratchet wheel 234 one step and that after said projection of rod 240 and during said one revolution of cam 132, rod 240, unless prevented from doing so as presently to be described, is moved to retracted position by spring 256 which, as stated, also maintains arm 254 in engagement with said cam and which also resiliently opposes movement of said arm by said cam. Provision is made for preventing actuation of rod 240 whereby to prevent upward movement of plate 184 of the record disk supporting means in case the uppermost record of the stack of disks is at the proper level for the transfer thereof to the turntable. The mechanism provided for this purpose comprises an arm 259 secured at one end of a vertical pivot pin 260 and provided at the other or free end thereof with a flat enlargement 262 adapted to project over the uppermost record, as shown in Fig. 10. Pivot pin 260 is mounted in a vertical bearing 261 (Fig. 3) fixed to a part of the frame. Arm 259 is movable over frame 198 outwardly of the latter from said position to a retracted position to permit transfer of the uppermost record from the stack to the turntable. For this purpose pivot pin 260 to which said arm is connected is provided at its lower end with an arm 264 (Fig. 3) having an upstanding finger 266 in the path of a pin 268 which is carried by the shaft 270 of the record-disk transferring means hereinafter to be described. Arm 259 is utilized for operating means including a lever 272 (Fig. 3) for preventing spring 256 from moving rod 240 to retracted position. Said lever is pivoted between its ends on a bracket 274, carried by lower frame member 190, by means of a pivot screw 276 and has a bent end portion 278 adapted to be projected between bracket 238 and bearing part 242 to prevent return movement of rod 240, as illustrated in Figs. 5 and 6. A spring 279 is connected at one end to lever 272 and at its other end to bracket 274 for urging said lever to projected position. The end of lever 272 opposite bent end portion 278 is connected to a vertically movable rod 280 which passes through a guide opening in part 282 of upper frame member 198. Arm 259 engages a collar 284 fixed to rod 280 at the upper end thereof. A spring 286 is disposed between frame part 282 and collar 284 and urges rod 280 upwardly, which upward movement, however, is prevented by arm 259 unless the end portion 262 of said arm is moved upwardly against the force of spring 288 which is fixed to said arm and to frame part 198 and normally urges said outer end of arm 259 downwardly, thus to maintain lever 272 in the retracted position illustrated in Fig. 3. When the end 262 of arm 259 is moved upwardly by the uppermost disk on plate 184 springs 279 and 286 cause rod 280 to move upwardly thereby to project the end 278 of lever 272 into the projected position illustrated in Fig. 5 for preventing retractive movement of rod 240 by spring 256, thereby preventing the reciprocation of pawl 236 for actuating the ratchet 234. Accordingly, it will be understood that when the uppermost disk is at the proper level actuation of rod 240 is skipped during the operation of the machine. It will be understood that arm 259 is connected to pin 260 so that said arm has sufficient vertical movement for operating rod 280 and for controlling the operation of said rod by springs 279 and 286 as hereinbefore described. Outward movement of arm 259 is limited by a stop pin 290 mounted on frame member 198 and inward movement of said arm is limited by the engagement with the outer edge of frame part 198 of a pin 291 fixed and depending from said arm.

Provision is made for raising and lowering plate 184 by manually operated means. Said manually operated means comprises a stub shaft 292 operated by a crank arm 294. Said shaft is mounted for rotation in a bar 296 supported at its opposite ends on shafts 216 and 230 and held in position by a screw 298. A gear 300 is fixed to shaft 292 and meshes with a gear 302 fixed to shaft 230. When crank 294 is operated for raising or lowering plate 184, actuating pawl 236 and retaining pawl 257 are disengaged from ratchet 234. For this purpose there is provided a lever 304 pivotally mounted at 305 on frame part 198 (Fig. 4) in position to engage said pawls. A spring retracted operating pin 306 is provided for engaging lever 304 for operating the latter to release said pawls from ratchet 234. A spring 308 is disposed about rod 286 below plate 184. Said spring is engaged by plate 184 when the latter is lowered and provides means for cushioning the descent of plate 184, but it is ineffective to exert sufficient upward pressure on plate 184 to move the latter.

The means for transferring the uppermost record from the supporting means to turntable 76 and from the latter to the discharge chute 28 will now be described. Said means comprises a suction head 310 having an apertured plate 312 secured at the lower end thereof for engagement with the disk. Said plate carries a spring projected centering pin 314 engageable with the upper end portion 316 of the turntable shaft 72 for centering the record on the turntable. Said centering pin 314 also engages the upper end of rod 186 when the suction head is in position over the stack of records on the supporting means. When centering pin 314 engages the upper end of rod 186 the spring 315 which projects said centering pin downwardly is compressed and subsequently projects pin 314 into the center opening of the record disk for closing said opening when the record disk is raised from the stack. When this occurs suction to the record disk or disks next below the uppermost disk is cut off thus preventing said last mentioned disk or disks from adhering to the uppermost disk and from being transferred therewith from the stack which might otherwise occur especialy if the disks are not perfectly flat. A relatively small opening 317 (Fig. 18) is provided in the suction head to permit the passage of air therein during the operation of the suction pump. Opening 317 is substantially smaller than the openings 319 in plate 312 and, therefore, does not sufficiently relieve the suction on the disk applied thereto through said openings 319. Said opening 317 is, however, larger than the opening which might exist between pin 314 and the edge of the center opening of the disk when pin 314 is seated in said center opening, and thus prevents suction from being communicated through the center opening to the disk or disks below the uppermost disk which is being moved from the stack. It will be also understood that pin 314 prevents displacement of the disk laterally of plate 132 during the movement of the suction head from the stack of record disks to the turntable, thus maintaining the disk properly centered on the suction head for engagement with the center pin 316 of the turntable when the record disk is lowered into position thereon. Suction head 310 is mounted for oscillation from the intermediate position shown in full lines in Fig. 10 to a position over the stack of records, from the latter position to a position over the turntable and from the turntable to said intermediate position. Suction head 310 is also movable vertically, that is, toward and away from the stack of records and toward and away from the turntable 74. Said movements of suction head 310 are provided for by mounting said suction head on a carrier member 318 which is mounted for oscillatory movement at the upper end of frame part 60. More particularly, said carrier member 318 is hollow and comprises vertical end portions 320 and 322 and a horizontally extending connecting portion 324 (Fig. 18). Carrier member 318 is oscillated by shaft 270 which extends through the carrier member supporting part 326 of member 60 and through the vertical end portion 320 of said carrier member. Shaft 270 is journalled for turning movement in bearing bushings 328 and 330 carried by frame parts 326 and 332, respectively. An upper end portion 334 of shaft 270 is enlarged to provide a shoulder 336 by which shaft 270 is supported in vertical position and for providing a shoulder 338 which is engaged by the confronting surface of the internal boss 340 formed in end portion 320 of the carrier member. The upper reduced end portion 342 of shaft 270 above shoulder 338 projects upwardly through said boss 340 and is engaged by a clamping nut 344 threaded thereon for fixing the carrier member 318 to the shaft for turning movement therewith. Nut 344 clamps the shoulder 338 against the inner edge of boss 340 and is itself clamped in position against the outer surface of carrier member 318 with an interposed lock washer 346.

Figure 11:
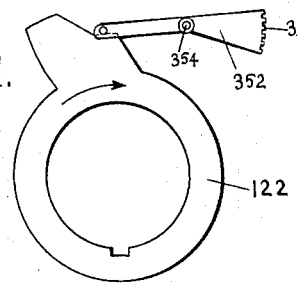

The means for oscillating shaft 270 comprises a gear 348 fixed to the lower end of said shaft and engaged by a gear sector 350. Said gear sector 350 is formed at the outer end of a lever 352 mounted for pivotal movement about a pivot pin 354 fixed to and depending from horizontal frame plate 62 (Fig. 17). Gear sector lever 352 is actuated by cam 122 and for that purpose is arranged to engage said cam which is designed as illustrated in Fig. 11 for imparting a plurality of intermittent oscillatory movements to shaft 270 for actuating carrier member 318 in such manner as to properly position the suction head 310 and properly move the same at predetermined times to the several above described positions thereof. A spring tensioned cord or wire 355 connected to pin 268 fixed to shaft 270 is effective to move said shaft and to resiliently oppose movement of said shaft under the control of cam 122. An adjustable stop member 355a for carrier member 318 is carried by an arm 355b fixed at the upper end of frame part 60. This stop limits the movement of said carrier member by spring tensioned cable 355 from the stack to the turntable.

Figures 12, 13:
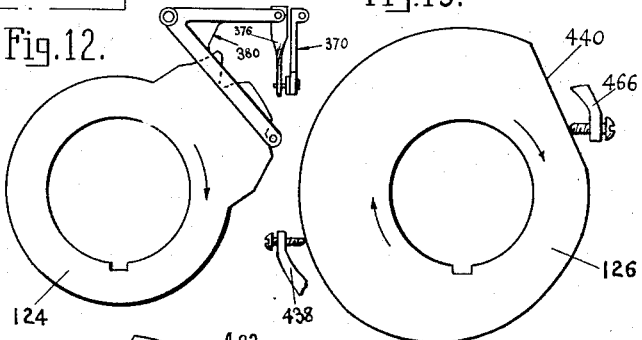
Figure 14:
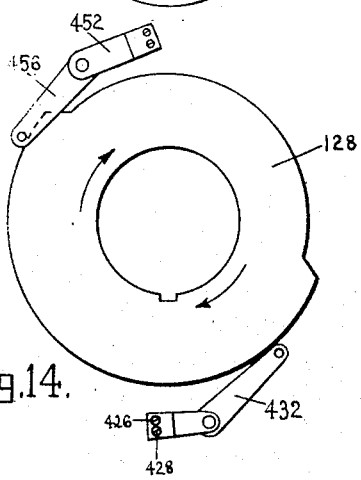

The vertical movement of suction head 310 is provided for by the mechanism which includes the lever 356 pivotally mounted between its ends on the bracket 357 at the top of carrier member 318 (Fig. 18). Said suction head has a part 358 which projects upwardly with a fluid-tight sliding and rotary fit through an opening 360 in carrier member 318 near end portion 322 thereof. Said upper part 353 of the suction head is engaged by the forked end 362 of one arm of the lever. The other arm of the lever is engaged at its end by a sleeve 364 in which the end of a cable, such as a wire or cord 366, is fixed. Said cable 366 projects longitudinally through hollow shaft 270 and is secured at its lower end in a sleeve 368 which engages one arm 370 of a bell crank lever. The other arm 372 of said bell crank lever which is pivotally mounted on the frame as indicated at 374 is pivotally connected at its outer end to one end of a link 376. The other end of said link is pivotally connected to one arm 378 of a bell crank lever 380 pivotally mounted on pivot pin 354. The other arm 382 of bell crank lever 380 engages cam 124, which as illustrated in Fig. 12, is appropriately shaped to actuate the bell crank and the mechanism actuated thereby for imparting the proper vertical movements to cable 366 for actuating lever 356 whereby to provide for the up and down movement of suction head 310. When the suction head transfers a record to the turntable 74, said disk 312 remains in contact with the disk on said turntable and is rotated thereby. The opening 360 in carrier member 318 and the opening 384 in the bottom of end portion 322 of said carrier member constitute bearings for said suction head during the rotary movement thereof and also constitute guides for the suction head in the vertical movement thereof. The suction head has a fluid-tight sliding and rotary fit with the inner surface of guide portion 384. It will be understood that the downward movement of the suction head is caused by the weight thereof under the control of cable 366 and that the upward movement of said suction head is caused by the pull of said cable on lever 356. Suction head 310 is provided with a flange 386 which is engageable with the lower end of part 322 of carrier member 318 for limiting the upward movement of said suction head. A spring 387 bearing on lever 356 assists the downward movement of the suction head and resiliently opposes the upward movement thereof.

Figures 15, 16:
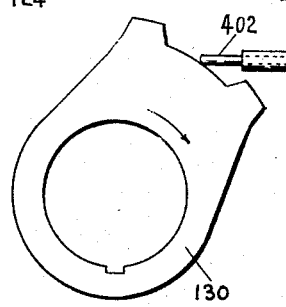

The upper end of the passage in the suction head is provided with a plurality of spaced openings 388 which communicate with the interior or passage 389 of carrier member 318. Said passage communicates at end part 322 of carrier member 318 with a passage 390 (Fig. 4). formed in frame member 60 for substantially the full length thereof. The lower end of said passage is connected by means of a pipe fitting 392 and by a pipe 394 to a suitable suction creating means such as a motor driven suction pump connected to a suction receptacle 396 in the lower compartment of the cabinet as illustrated in Fig. 2. Said suction receptacle is connected to any suitable motor operated suction pump which may be contained in a casing 398 disposed in said lower compartment of the cabinet. A normally closing spring plate valve 400 is disposed in the passage 390 of frame member 60 for interrupting the communication between the suction means and the suction head. Said valve is opened by a rod 402 under the control of cam 130 which is appropriately shaped as illustrated in Fig. 15 for actuating rod 402 whereby to open valve 400 at the proper times whereby to apply suction to head 310 and to release the suction at the proper times in the operation of the apparatus. The resiliency of plate valve 400 maintains said valve normally closed thereby to close the passage through frame member 60 and by bearing on the inner end of rod 402 maintains the latter in contact with cam 130.

It will be understood that suction is applied to suction head 310 when the latter is moved upwardly for lifting the uppermost record from the stack preliminary to the turning movement of said suction head for transferring the record to the turntable, the suction being cut off by the closure of plate valve 400 when the record disk is placed on the turntable. After the recording operation and after the reproduction of the record, as hereinafter described, suction head 310 with suction applied thereto is raised thereby to lift the record from the turntable preliminary to the turning movement of said suction head for transferring the record to the dispensing position thereof, that is, to the intermediate position of the suction head illustrated in Fig. 10 and also in Fig. 18, in which position the record is over the upper end of the discharge chute 28, as illustrated in Fig. 18. When the record is in this position suction is cut off by closure of valve plate 400 and the record drops into chute 28. When the suction is cut off, the weight of the record, which is a metal disk, is sufficient to cause the latter to drop from plate 312, especially as sufficient air passes into the suction head through the joints between relatively movable parts to break the vacuum when the suction valve is closed and the pump stopped.

It will be observed that the initial step in the operation of the machine is the actuation of the record-disk transferring means whereby the suction head is moved from its intermediate position to a position over the stack of records, after which said suction head is lowered to engage the uppermost record disk of the stack, suction being applied at about the time said suction head engages said record disk, following which said suction head is raised to lift the uppermost record from the stack, after which said suction head is moved to a position over the turntable and then lowered for placing the record carried thereby on the turntable, the suction being then cut off from the suction head and the latter remaining in its lower position during the turning of the record by the turntable. When the record is in this position the sound recording means and the sound reproducing means which will now be described are associated, respectively, in succession with the record disk for first recording the operator's voice and thereafter for reproducing the record prior to the next movement of the transfer means for dispensing the recording disk.

Figure 3A:
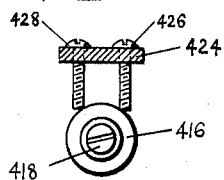
Fig. 3a is a detail sectional view of part of the sound recorder.

The sound recording means comprises a head 408 carrying any suitable sound responsive cutting element. Said head 408 is pivoted in a bracket 410 on a pin 411 for turning movement toward and away from the upper surface of the record disk on the turntable. Said head 408 is provided with a pin 412 which projects laterally therefrom and is connected to a lever 414 which is pivoted on said pin 411. The lower arm 415 of lever 414 projects forwardly and toward the right as shown in Fig. 4a and has a roller 416 fixed to the outer end thereof on a pin 418. A counterweight 420 is adjustably mounted on a pin 422 projecting from lever arm 415 at right angles to pivot 411 in a direction opposite to recorder head 408, the purpose of this being to regulate the pressure of the recorder on the record when the recorder is in record-engaging position. Movement of the recorder head 408 toward the surface of the record disk takes place under the weight of the recorder head under the control of an arm 424. Said arm is provided at one end thereof with a pair of adjustable pins such as screws 426 and 428 positioned to engage roller 416 of lever 414. Arm 424 is fixed to the upper end of a vertical rod 430 which is mounted for turning movement in upper frame member 62. The lower end of said rod 430 has an arm 432 which engages and is operated by cam 128. The rotation of cam 128 is effective to control the actuation of arm 424 whereby to move the latter forwardly (viewing Fig. 10) for disengaging screw 426 from roller 416 to permit the recorder head to engage the record disk. The lower ends of a screw 428 and of screw 426 engage roller 416 at spaced points below the uppermost point of said roller (Fig. 3a) when the recorder head is in disk-engaging position, thus holding said roller against upward movement. Subsequently, after completion of the recording operation arm 424 is moved rearwardly under the control of cam 128 thereby to engage roller 416 by screw 426 for raising the recorder head from the record. In the normal use of the apparatus screw 428 is retracted so that it does not engage roller 416, said roller being operated by screw 426 to raise the record head or to allow the same to move down into engagement with the record disk. Screw 428 is used in testing the recorder at the factory under a condition when its is not desired to operate arm 424 by cam-operated rod 430.

When the recorder head is lowered into engagement with the record disk on the turntable, said recorder head is moved radially inwardly toward the center of the disk so that a spiral sound groove is cut into the record. The means for thus moving the recorder head comprises the arm 434 which carries the bracket 410 for the pivotal mounting of the recorder head. Said arm is fixed to a vertical rod 436 mounted for turning movement in frame member 62. The lower end of rod 436 has an arm 438 fixed thereto which, at its outer end, engages and is operated by cam 126 which, as illustrated in Fig. 13, is appropriately designed to impart the correct motion to said arm 438 and to the recorder head for effecting the spiral path of the disk cutter carried by the recorder head during the rotation of the disk for recording purposes. It will be observed that cam 126 is provided with an edge portion 440 for effecting a quick return of the recorder head radially of the disk to a retracted position upon the completion of the recording operation so that the reproducing operation can begin as soon as possible after the recording operation. A spring 441 connected to arm 438 holds the latter in engagement with companion cam 126.

The sound reproducing means comprises a reproducer head 442 pivotally mounted in a bracket 444 on a pin 446. The mechanism for moving said reproducer head toward and away from the disk on the turntable is substantially the same as the mechanism hereinbefore described for the same purpose in reference to the recorder head 408, with the exception that a spring 448 is connected to the reproducer head operating lever 450 instead of providing the latter with an adjustable counterweight. The arm 452 for operating lever 450 is connected to the upper end of rod 454 which is mounted for turning movement in the frame and which is provided at its lower end with an arm 456 which engages companion cam 128. It will be noted that arm 452 for actuating lever 450 is provided with a pair of screws which engage the roller 458 on the end of said lever. It will be understood that when rod 454 is turned for permitting the reproducer head to be projected into position for engagement with the record the pair of adjustable elements or screws carried thereby operate in the same manner as the screws 426 and 428 associated with the recorder head, screw 460 disengaging the roller of lever 450 to permit the reproducer head to move under its own weight to operative position in relation to the record. When the reproducer head is moved into operative position it is also preferably moved along a spiral path corresponding to the spiral groove produced in the record by the cutting device of the reproducer head. For this purpose bracket 444 on which the reproducer head is mounted for turning movement toward and away from the surface of the record is carried by an arm 462 which corresponds to the arm 434 associated with the recorder head and operates in the same way. Said arm 462 is fixed to the upper end of a rod 464 which is mounted for turning movement in the frame. The lower end of said rod is provided with an arm 466 which engages the companion cam 126. A spring 468 is provided for holding the arm 466 in engagement with cam 126. It will be understood that upon completion of the operation of the machine arm 466 has the position illustrated in Fig. 13 in relation to cam 126 but that when the next operation of the machine occurs the rotation of cam 126 is effective to move the reproducer head quickly to inoperative position adjacent the outer edge of the turntable since the arm 466 is in engagement with the rapid movement portion 440 of said cam.

Provision is made for removing the cuttings of the record disk produced during the recording operation by the action of the cutting element of the recorder head on the record disk. For this purpose a suction nozzle 470 is arranged to be brought close to the upper surface of the disk during the recording operation. Said nozzle is carried by an arm 472 pivoted at one end thereof in a bracket 474 supported at the upper end of a post 476 mounted on the frame. Nozzle 470 is urged by its own weight toward the record and is moved to retracted position by an arm 478 fixed to the recorder head 408 so that said nozzle is automatically lowered and raised for moving the same into operative and inoperative positions, respectively, when the recorder head is similarly moved. Said nozzle is provided on one side thereof with a brush or cloth wiper 480 which holds the cuttings adjacent the inlet opening of the suction nozzle during the action of the latter on the record disk. It will be understood that the inlet opening 482 of the suction nozzle extends radially of the record disk and is long enough to take up all of the cuttings made during the recording operation without requiring a radial movement of the suction nozzle. The upper end of the suction nozzle is connected by means of a flexible pipe 484 to the suction box 396 which has a compartment (not shown) for the collection of the cuttings in the lower compartment of the cabinet.

The electrical pick-up device 486 (Fig. 7) with which the reproducer head 442 is provided is adjustable in a direction radially of the record disk on the turntable to provide for registry of the stylus of the pick-up device with the record groove at the commencement of the sound reproducing operation. For this purpose the sound pick-up device is carried by an arm 488 which is pivotally mounted at one end thereof on pivot pin 492 for movement laterally of the supporting arm 490 of the reproducer head. An adjusting pin 494 engages arms 488 and 490 and is movable in relation thereto for moving arm 488 laterally of arm 490 about pivot pin 492.

As hereinbefore indicated the machine is operated under the control of a coin-actuated or controlled mechanism. This mechanism will now be described, reference being more particularly had to Figs. 3, 21 and 22. Said mechanism comprises a lever 496 which, as shown in Fig. 21, projects into the coin chute 44 in the path of the coin C which may be inserted in the coin slot 42 for starting the operation of the machine. When the coin strikes the lever in the chute, said lever is retracted and operates the mechanism and permits the coin to pass into the collection receptacle. Said lever 496 is pivotally connected by a pivot pin 498 to the upper end of an arm 500 which is pivotally mounted at its lower end on plate 504 by means of a pivot pin 502. An electric switch holder 506 is carried by an arm 508 in fixed relation thereto, said arm being pivotally mounted on pin 498 which pivotally connects coin-actuated lever 496 to arm 500. One end of arm 508 is provided with a roller 510 which engages a U-shaped guide member 512 carried by plate 504, the opposite confronting ends of said guide serving to eliminate the movement of switch holder 506 in opposite directions, respectively. A three-pole or two-way mercury switch 514 and a two-pole mercury switch 516 are carried by switch holder 506 and are movable with the latter. A spring 518 connected to plate 504 and to arm 508 of the switch holder biases the latter for movement in a counterclockwise direction (viewing Figs. 3 and 21) about pivot 498. A retaining plate 520 is pivotally mounted on supporting plate 504 by a pivot pin 522. Said retaining plate is provided with an edge portion 524 which engages the inner end of coin-actuated lever 496 for releasably retaining said lever and the switch holder mounted on pivot pin 498 in initial position in which the switch holder is in the full line position. When the coin strikes the end of the lever in the coin chute the opposite end thereof disengages retaining plate 520 and is moved by spring 526 to the left (viewing Fig. 22) in engagement with the upper edge 528 of said plate. The switch holder then moves to the secondary or dotted line position illustrated in Figs. 21 and 22 and remains in this position until near the end of the operation of the machine or for one revolution of gear 150. Just prior to the completion of one revolution of said gear, retaining plate 520 is actuated for causing the movement of lever 496 and of the switch holder to their primary or full line position. For this purpose said plate is constructed and arranged to be actuated by a lever 530 pivotally mounted on a pin 532 on supporting plate 504. Said pin projects through an arcuate slot 534 in retaining plate 520, said slot permitting pivotal movement of said retaining plate transversely of pin 532. The upper end of lever 530 is provided with a roller 536 which is in the path of and is momentarily engaged by a pin 538 fixed to and depending from gear 150. Retaining plate 520 has a pin 540 fixed therethrough and projecting therefrom in position to be engaged at the lower end of lever 530. Thus, just before gear 150 completes its revolution, that is, near the end of the operation of the machine, pin 538 engages the roller 536 of lever 530 and moves the latter clockwise (viewing Fig. 22) thus causing retaining plate 520 to move counterclockwise to a position in which lever-retaining part 524 of said plate is somewhat at the left of the adjacent end of lever 496. At this time spring 542 pulls lever 496 down to a position for engagement of the edge thereof with part 524 of the retaining plate. When this occurs a spring 544 connected to said retaining plate and acting thereon moves the latter in a clockwise direction, still viewing Fig. 22, thus moving lever 496 and the switch holder 506 to their primary or full line position ready for the next operation of the machine.

The machine is provided with means associated with coin chute 44 for returning coins which may be inadvertently or otherwise inserted in coin slot 42 during the operation of the machine and also in the event of depletion of the supply of record disks. It will be noted that following the insertion of a coin for initiating the operation of the machine coin-actuated lever 496 is withdrawn from chute 44 thus to permit the passage of the coin through the chute into the coin collection receptacle indicated at 546 in Fig. 2. Consequently, if a coin is inserted while the machine is in operation, the coin would pass through the chute into the collection receptacle. To prevent this from occurring, if a coin is inserted during the operation of the machine, a device is provided for obstructing the upper part 548 of the coin chute and for causing the coin to drop into a return chute passage 550 which communicates at its outlet end with the coin return opening 46 indicated in Figs. 1 and 2. Said device comprises a pin 552 movable into and out of upper part 548 of the chute. Said pin is fixed to and projects from one arm 554 of a bell crank lever mounted for pivotal movement on a pivot pin 556. The other arm 558 of said bell crank lever is operated by a cable wire or cord 560 which passes over a guide roller 562 (Fig. 21) and is connected to arm 508 of the coin-actuated mechanism. Thus, when said coin-actuated mechanism is actuated to initiate the operation of the machine movement of arm 508 as hereinbefore described causes cable 560 to actuate the arm 558 of the bell crank lever for projecting pin 552 into the upper part of the coin chute so that in the event that another coin is inserted while the machine is in operation said coin will be deflected by pin 552 into the return chute 550 and from the latter to the return opening 46.

Pin 552 is also projected into the coin chute in the event that the supply of record disks is depleted. For this purpose a mechanism is provided for actuating the arm 558 of the bell crank lever when the supply of record disks is exhausted. This mechanism includes an arm 564 fixed to and projecting from the pulley 212 of the means for moving the plate which carries the stack of record disks. An arm 566 is pivotally mounted in a frame bracket 568 and positioned to be engaged by arm 564 when the latter moves to the position illustrated in Fig. 21 which is the position of arm 564 when plate 184 of the record supporting means is in its uppermost position and all of the record disks have been removed therefrom. Arm 556 is connected to a cable wire or cord 570 which passes over guide pulleys 572 and 574 and is connected to an arm 576. A shaft 578, mounted for turning movement, has one end thereof connected to said arm 576 and has its other end connected to an arm 580. The outer end of arm 580 is provided with a tappet 582 disposed over the outer end of arm 558 of the bell crank lever. Thus, when arm 566 is moved in a clockwise direction (viewing Fig. 21) shaft 578 is turned by arm 576 to move arm 580 for engaging the tappet 582 thereof with arm 558 of the bell crank lever for projecting chute obstructing pin 552 into the upper part 548 of the chute. It will be understood that pin 552 remains in chute-obstructing position until the supply of record disks is replenished. Coin chute obstructing pin 552 is normally held in retracted position by a spring 584 connected to arm 558 of the companion bell crank lever, and a spring 586 holds arms 580 in retracted position and resiliently opposes movement of arm 576 and returns arm 566 to initial position following the release of said last mentioned arm by arm 564.

The main motor M which operates the turntable has a considerably greater load thereon during the recording operation than during the reproducing operation, and for this reason with the type of motor customarily used in recording machines, the speed of the motor increases somewhat when the transfer from recording to reproducing takes place. Consequently, in order to maintain the speed of the turntable constant, that is, at about 78 R. P. M. a compensating resistance R (Fig. 27) is inserted in the motor circuit at the time of change-over from recording to reproducing. Said resistance is preferably a non-inductive resistance such as an incandescent lamp whereby to eliminate delay in the effect of the resistance. In the stage of operation of the machine from the start thereof to the point at which the reproducer is operated, said resistance is short-circuited under the control of a switch, here shown as a mercury switch 588 mounted on a pivoted holder plate 590 (Figs. 4 and 10). Another switch, here shown as a mercury switch 592, is also mounted on holder 590 and is actuated at the time the reproducer begins to operate for stopping the motor MS (Fig. 27) which actuates the suction pump, the suction being unnecessary during the operation of the reproducer. Plate 590 is pivoted on the frame as indicated at 594 in Fig. 4 and is actuated by a link 596 pivotally connected to the upper end of said holder and to a pin 598 fixed to and turned in a horizontal plane by rod 454 which actuates the mechanism for lowering and raising the reproducer head. Thus, when the reproducer head is lowered switches 588 and 592 are opened for inserting resistance in the circuit of the main motor and for stopping the suction pump motor, respectively, and said switches remain open until the reproducer head is raised, at which time said switches 588 and 592 are closed for cutting out resistance R and for starting the suction pump motor, respectively.

During the recording operation the microphone 31 and the recorder head 408 are connected to the amplifier 600 (Fig. 27), and when the reproducer operates, the recorder and the microphone are disconnected from the amplifier and the reproducer is connected to the amplifier, as is also either the earphone 32 or the loud speaker 34, at the option of the operator under the control of switch 36. Change-over switches 602 and 604 which are actuated automatically during the operation of the machine by suitable mechanism as will presently be described are utilized for connecting and disconnecting at appropriate times the recorder and microphone and the reproducer and companion earphone or loud speaker. The switch mechanism illustrated more or less in detail in Figs. 28 to 32 is disposed in a switch box 606 (Fig. 2) which can be placed in a suitable part of the cabinet. Said switch mechanism is operated under the control of pins 608 and 610 fixed to and projecting from gear 150. A lever 612 is mounted on the frame for actuation alternately by said pins 608 and 610 during the operation of the machine, one arm 614 of said lever being disposed in the path of movement of said pins. The other arm 616 of said lever is connected to a cable wire or cord 618. Cable 618 is directed by means of guide pulleys 620 and 622, and is connected to a lever 624 pivoted at 626. A spring 628 is also connected to said lever 624 for resiliently opposing actuation thereof in one direction and for projecting the pawl 630 carried by said lever to move ratchet wheel 632 step by step. A limiting pawl 633 is also carried by lever 624. The ratchet 632 which is actuated by pawl 630 is fixed to a shaft 634 for turning the latter step by step. Toothed members 634 and 636 of insulation material are fixed to shaft 634 and are turned by the latter for operating switches 602 and 604. Each switch comprises a spring arm 640 fixed at one end and engageable at its other end alternately with the stationary contacts of the companion change-over switch. The stationary contacts of switch 602 are indicated at 642 and 644 and the stationary contacts of switch 604 are indicated at 646 and 648, said stationary contacts of each of said switches being alternately engaged by the companion spring arm 640 under the control of toothed members 634 and 636, respectively.

A feature of the present invention resides in providing the machine with means for calling attention thereto. Said means preferably comprises an automatically operable phonograph 654 (Fig. 2) of the automatic repeating type. The electric motor for rotating the turntable 655 of said phonograph is indicated at 654a in the circuit diagram of Fig. 27, the pick-up of this phonograph being indicated diagrammatically at 656. Said motor 654a is supplied with current from the lines L1 and L2 through the contacts 514a and 514b of switch 514 and through a timing device 658. The amplifier 600 derives its operating voltage from supply lines L1 and L2 under the control either of switch 514 or of switch 516 which are operated under the control of the coin actuated mechanism described above. When the machine is not being operated switches 514 and 516 are in their above described primary positions in which contacts 514a and 514b of switch 514 are closed by the mercury in the switch thereby to complete the circuit through phonograph motor 654a of the repeater phonograph under the control of the timing device 658 and also to the input side of the amplifier 600 over the wire 660. When a coin is inserted in the machine for initiating the operation thereof switches 514 and 516 are moved to their other positions, thus opening the circuit through the timer 658 and the branch wire 660 under the control of switch 514 and closing the circuit through switch 516 to the input side of the amplifier. The movement of switch 514 closes contacts 514a and 514c thereof to complete a circuit under the control of said switch from the line L1 to the lines 662 and 664 which supply current to the main motor M and to the motor MS of the suction pump. The main motor M which operates the shaft 70 is thus energized and the machine begins to operate. It will be understood that as soon as the machine begins to operate the phonograph 654 is rendered inoperative to produce sound, as will hereinafter be described, but it is desirable to permit the turntable 655 to rotate until the tone arm of the phonograph is returned to the initial position by mechanism customarily provided in automatic electrical phonographs of the repeating type. For this purpose a branch wire 666 is connected to line L1 and through the tone arm controlled repeater device 668, diagrammatically illustrated in Fig. 27, to the turntable motor 654a of the phonograph. Although the turntable of phonograph 654 continues to rotate after contacts 514a and 514b are disconnected pursuant to the operation of switch 514 upon an insertion of a coin which initiates the operation of the machine the pick-up device 656 of said phonograph is rendered immediately inoperative to produce sound. For this purpose there are provided switches 670 and 672 (Fig. 27) which make and break the electrical connections between the amplifier 600 and the pick-up device and the loud speaker 34, respectively. As here shown said switches are opened by electro-magnets 674 and 676, respectively, connected in the circuit through the contacts 514a and 514c of switch 514, it being understood that when switch 514 is operated under the control of the coin actuated mechanism a circuit is completed by switch 514 at the contacts 514a and 514c thereof for energizing magnets 674 and 676 thereby to move the companion movable switch members to circuit-opening position. Switch 671 which is opened by a magnet 675 and closed by a spring 681 is provided to prevent current from passing to motor 654a over line 660 when switch 516 is closed. For this purpose magnet 675 is energized under the control of contacts 514a and 514c of switch 514, said contacts being closed when switch 516 is closed. After the operation of the machine and the movement of switch 514 to its initial position contacts 514a and 514c are opened thus breaking the circuit of magnets 674, 675 and 676 and permitting the companion switches 670, 671 and 672 to be closed by their springs 678, 679 and 680, respectively. Phonograph 654 then operates under the control of its repeating mechanism and the timer 658 until the next operation of the machine. The timer and the repeater mechanism for the phonograph can be of any suitable types, and if desired the timer can be dispensed with, although its use is preferred. As here shown manually operable switches 682 and 684 can be provided for interrupting the circuit of phonograph 654 when it is desired to utilize the machine of the present invention without said phonograph.

In accordance with the present invention the machine is provided, as stated above, with an electrically operated indicator 40 which is actuated during the recording operation to signal to the operator the time remaining before the start of the reproducing operation so that the operator can use his judgment as to the subject matter which he wishes to have recorded on the record disk. Said indicator may comprise a plurality of electric lamps 686 arranged in a row on the wall 18 of the cabinet and energized automatically in succession under the control of the movable contact members 688, 690 and 692 which engage stationary contact strips fixed to an insulation disk 694 (Figs. 17 and 23) mounted in position on frame part 64. Movable contact member 688 engages in succession the contact strips 696 to 708 which are fixed to disk 694 and insulated from each other. Conductor strip 710 which is continuous is connected to one side of the line and is engaged by movable contact member 692. The signal lamps 686 are connected at one side thereof through the contact strips 696 to 708, respectively, and are energized in succession when movable contact member 688 engages the companion contact strips 696 to 708, respectively, during the operation of the machine. An additional contact strip 712 is provided on disk 694 and is engaged by movable contact member 690 shortly before the time allotted for the recording operation is consumed and the reproduction operation is about to begin. This contact strip 712 and the companion contact member 690 controls the circuit of a signal lamp 714 which together with an arrow calls the attention of the operator to the switch 36 to afford the operator an opportunity to select either the earphone 32 or the loud speaker 34 for listening to the record when reproduced.

The operation of the machine is believed to be apparent from the above description but by way of a brief recapitulation, said operation is as follows: When a coin is inserted in the coin slot 42, the coin actuated mechanism operates switches 514 and 516 to start the main motor M and the motor MS for operating the suction pump. The turntable begins to rotate and the suction head 310 moves from its intermediate position to a position over the stack of records and then downwardly for engagement with the upper surface of the uppermost record. Then the suction head is raised, lifting the uppermost record therewith and then turns from its position over the stack of records to a position over the turntable 74, in which position said suction head is moved downwardly for placing the record on the turntable, said suction head resting on the record on the turntable during the rotation thereof. As soon as the record is placed on the turntable the recorder head 408 is moved radially from its retracted position toward the center of the record and is also moved downwardly for engaging the record for cutting the record groove therein. After a predetermined rotary movement of the cam drum 118 the recorder head is moved to its retracted position and the reproducer head 442 is moved from its retracted position to its operative position for bringing the pick-up device into engagement with the record groove. The record may then be heard either through the earphone 32 or through the loud speaker 34 as selected by the operator by the actuation of switch 36. During the reproducing operation switch 588 is opened for inserting the resistance R in the circuit of the main motor M to compensate for the decrease in the load on said motor at the end of the recording operation, and during the reproducing operation the switch 592 is also opened to stop the motor MS of the suction pump. At the end of the reproducing operation the reproducer head is retracted and the suction head is raised, thereby lifting the record disk from the turntable, and is turned to the intermediate position shown in Fig. 10 which places the record over the discharge chute for dispensing the record. The suction to the suction head is cut off when the latter is in dispensing position. This completes the cycle of operations of the machine, the switches 514, 516, 588 and 592 being restored to their original positions and the operation of the machine terminating with the parts thereof in proper position for actuation upon the next insertion of a coin. In the meantime, between operations of the machine, the phonograph 654 is operated under the control of switch 514 and associated timer 658 whereby to attract attention and custom to the machine.

Thus, it is seen that the machine described above is well adapted to accomplish the several objects of the present invention. It will be understood, however, that while I have shown and described the preferred embodiment of the machine, the latter may be embodied otherwise than as herein specifically shown or described, and it will be also understood that in the present embodiment certain changes in the details of construction, in the mechanisms for performing the several functions, and in the arrangement of parts may be made and will occur to skilled artisans in view of the present disclosure. Therefore, I do not dish to be limited to the invention as herein specifically illustrated or described except to the extent which may be required by the scope of the appended claims.

Having thus described my invention, what I claim and desire to secure by Letters Patent is:

1. In a phonographic recording machine, a rotary support for a record disk, means for supporting a stack of record disks, means for transferring individual disks from the stack to said rotary support, said transferring means comprising a suction head, a carrier for said suction head, said carrier being mounted for oscillation and said suction head being mounted on said carrier for oscillation therewith and also for movement vertically thereof toward and away from said support and said supporting means, a lever pivotally mounted on said carrier and operatively connected to said suction head for moving the same vertically, means for oscillating said carrier, and means operable in timed relation to said oscillating means for actuating said lever to raise and lower said suction head.

2. In a phonographic recording machine having a rotary support for a record disk, movable means for supporting a stack of record disks, and means for transferring individual disks from the stack to said rotary support, means for moving said disk-stack supporting means comprising a pair of driving rollers positioned below said supporting means, a pair of guide rollers positioned above said supporting means, a pair of cables connected at their opposite ends to said driving rollers and to said supporting means, respectively, and passing over said guide rollers, respectively, whereby portions of said cables are wound around said driving rollers, respectively, when the latter are rotated in a predetermined direction, means for turning said driving rollers step-by-step in said direction, and means operable in timed relation to said transferring means for actuating said last mentioned means whereby to move said supporting means a short distance after the removal of a record disk therefrom by said transfer means.

3. In a phonographic recording machine having a rotary support for a record disk, means for supporting a stack of record disks, and means for transferring individual disks from the stack to said rotary support, means operable in timed relation to the movement of said transfer means for moving said supporting means a predetermined short distance after removal of a record disk therefrom, said moving means comprising a ratchet and a pawl releasably engageable with said ratchet for operating the same step-by-step, means actuated in timed relation to said movement of said transfer means for projecting said pawl into engagement with said ratchet for actuating the same step-by-step, spring means for retracting said pawl from said ratchet, and means operable under the control of the record disks on said support for releasably preventing the retraction of said pawl whereby to render said moving means inoperative when the top record on the stack is at a predetermined height.

4. In a phonograph recording and reproducing machine having a rotary horizontal support for a record disk and means for supporting a supply of disks in position laterally of said rotary support, means for transferring said disks individually to said rotary support and for removing the disk from said rotary support, said disk transferring means comprising a suction head positioned above said rotary support and above said supporting means and engageable with the record disks, a carrying member for said head mounted for oscillatory movement about a vertical axis and in fixed vertical relation above said support and said supporting means, said head being movable vertically in relation to said carrying member and vertically toward and away from said rotary support and said supporting means, means for moving said carrying member and thereby moving said suction head to positions over said disk supporting means and over said rotary support, respectively, and means for moving said suction head vertically toward and away from said supporting means and said rotary support, respectively, in each of said positions of said suction head while said carrying member is in fixed vertical position thereof.

5. In a phonograph recording and reproducing machine having a rotary support for a record disk and means for supporting a supply of disks, means for transferring said disks individually to said rotary support and for removing the disk from said rotary support, said disk transferring means comprising a suction head engageable with the record disks, a carrying member for said head mounted for oscillatory movement, said head being movable vertically in relation to said carrying member, means for moving said carrying member and thereby moving said suction head to positions over said disk supporting means and over said rotary support, respectively, and means for moving said suction head vertically toward and away from said supporting means and said rotary support, respectively, in each of said positions of said suction head, said suction head being mounted for rotation on said carrying member and bearing on the upper surface of the record disk when the latter is on said rotary support and is rotated thereby.

6. In a phonograph recording and reproducing machine having a horizontal rotary support for a record disk and means for supporting a supply of disks in position laterally of said rotary support, means for transferring said disks individually to said rotary support and for removing the disk from said rotary support, said disk transferring means comprising a suction head engageable with the record disks, a carrying member for said head mounted for oscillatory movement, said suction means being vertically movable on said carrying member, said carrying member having a passage therethrough in communication with said suction head, a stationary support on which said carrying member is mounted, said carrying member being movable only horizontally on said last mentioned support, the latter being provided with a passage in communication with said passage in the carrying member and adapted to be connected to suction means, and a valve in said support for controlling said passage therein.

7. In a phonograph recording and reproducing machine having a horizontal rotary support for a record disk and means for supporting a supply of disks laterally of said rotary support, means for transferring said disks individually to said rotary support and for removing the disk from said rotary support, said disk transferring means comprising a suction head engageable with the record disks, a carrying member for said head mounted for oscillatory movement, said carrying member having spaced vertical parts and a cross part provided with a continuous passage therein, said suction head being mounted on one of said vertical parts and movable vertically thereof toward and away from said rotary support and said supporting means and having a passage therein in communication with said first mentioned passage, said other vertical part of said carrying member being adapted to be connected to suction means, and a stationary support on which said other vertical part of said carrying member is mounted for said oscillatory movement thereof, said carrying member being movable only laterally of said rotary support and said supporting means, means for oscillating said carrying member, and separate means for moving said suction head vertically on said carrying member in relation thereto toward and away from said rotary support and said supporting means.

8. In a phonographic recording machine, a rotary support for a record disk, means for supporting a stack of record disks, and means for transferring individual disks from the stack to said rotary support and comprising a suction head having means engageable with the record disk for preventing the passage of air through the center opening therein, said last mentioned means comprising a spring projected pin movably mounted in said head and movable to a partially retracted position when said suction head engages the record disk while the latter is on said rotary support.

9. In a phonographic recording machine having a rotary support for a record disk and means for supporting a stack of records, means for transferring the disks one at a time from said stack support to said rotary support comprising a suction-head carrier mounted for oscillation above said supports, a suction head mounted on said carrier in position above said supports for oscillation therewith and for relative movement vertically thereof toward and away from said supports, means for oscillating said carrier, and means operable in timed relation to said oscillating means for moving said suction head on said carrier vertically thereof toward and away from said supports.

10. In a phonographic recording machine having a rotary support for a record disk and means for supporting a stack of records, means for transferring the disks one at a time from said stack support to said rotary support comprising a suction-head carrier mounted for oscillation above said supports, a suction head mounted on said carrier in position above said supports for oscillation therewith and for relative movement vertically thereof toward and away from said supports, a stationary support for said carrier, said carrier support and said carrier having fluid passages in communication with each other and said suction head being in communication with said fluid passage of said carrier, means for oscillating said carrier, means operable in timed relation to said oscillating means for moving said suction head on said carrier vertically toward and away from said supports, and means operable in timed relation to the vertical movements of said suction head for controlling the application of suction thereto through said passages.

11. In a phonographic recording machine, a rotary support for a record disk, means for supporting a stack of record disks, means for transferring individual disks from the stack to said rotary support, said transferring means comprising a suction head, a carrier for said suction head, said carrier being mounted for oscillation and said suction head being mounted on said carrier for oscillation therewith and also for movement vertically thereof toward and away from said support and said supporting means, a lever pivotally mounted on said carrier and operatively connected to said suction head for moving the same vertically, a hollow shaft connected to said carrier for oscillating the same, a member extending through said hollow shaft and connected at one end thereof to said lever for actuating the latter, means for oscillating said shaft, and means connected to said lever-actuating member and operable in timed relation to said shaft-oscillating means for operating said lever-actuating member whereby to move said suction head vertically in timed relation to the oscillating movement thereof.

12. In a phonographic machine having a rotary horizontal support for a record disk, means for supporting a stack of records in position laterally of said horizontal support, and means positioned above said supporting means for transferring the record disks one at a time from the top of said stack to said rotary support, said supporting means comprising a stationary frame member open at the bottom and at the top thereof, a horizontal plate on which the stack of records is carried mounted for movement axially of said frame member toward the top thereof for moving the record disks into said frame member through the bottom thereof to positions for engagement of the top record disk of the stack by said transferring means, said plate having a center opening therethrough, a stationary vertical rod passing through said opening and through the central openings in the record disks of the stack for guiding said plate and for centering said record disks on said plate, a pair of vertical guide rollers carried by said frame at diametrically opposite points, a pair of rotary vertical drums positioned at similar opposite points below said guide rollers, respectively, cables connected to said plate and passing upwardly therefrom over said rollers and connected to said drums, respectively, and means for rotating said drums for winding said cables thereon to thereby raise said plate.

ALEXANDER LISSIANSKY.